United States Patent
Madsen et al.

(10) Patent No.: US 12,184,816 B1
(45) Date of Patent: *Dec. 31, 2024

(54) MODEL-BASED COMMUNICATION ROUTING SYSTEM AND METHOD

(71) Applicant: United Services Automobile Association (USAA), San Antonio, TX (US)

(72) Inventors: Merrill Lamar Madsen, Anthem, AZ (US); Allen James Guidry, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,058

(22) Filed: Oct. 17, 2023

Related U.S. Application Data

(63) Continuation of application No. 17/538,488, filed on Nov. 30, 2021, now Pat. No. 11,792,326.

(51) Int. Cl.
*H04M 3/00* (2024.01)
*H04M 3/42* (2006.01)
(Continued)

(52) U.S. Cl.
CPC ....... *H04M 3/5235* (2013.01); *H04M 3/4217* (2013.01); *G06N 20/00* (2019.01)

(58) Field of Classification Search
CPC ... H04M 3/5235; H04M 3/4217; G06N 20/00
(Continued)

(56) References Cited

U.S. PATENT DOCUMENTS

| | | | |
|---|---|---|---|
| 9,047,631 B2 | 6/2015 | Sridharan et al. |
| 9,483,570 B2 | 11/2016 | Connan et al. |

(Continued)

*Primary Examiner* — William J Deane, Jr.
(74) *Attorney, Agent, or Firm* — Fletcher Yoder, PC

(57) ABSTRACT

A method includes receiving, at one or more processors, data indicative of a customer communication, inputting, via the one or more processors, the data to a first communication routing model corresponding to a first product or service goal associated with one or more product or service types, and determining, via the one or more processors and based on the first communication routing model, a first score corresponding to a first likelihood that the customer communication will satisfy the first product or service goal. The method also includes inputting, via the one or more processors, the data to a second communication routing model different than the first communication routing model and corresponding to a second product or service goal associated with the one or more product or service types, and determining, via the one or more processors and based on the second communication routing model, a second score corresponding to a second likelihood that the customer communication will satisfy the second product or service goal. The method also includes routing, via the one or more processors, the customer communication to a member service representative group based on a comparison of the first score with the second score or a first weighted score derived from the first score with a second weighted score derived from the second score.

20 Claims, 5 Drawing Sheets

(51) Int. Cl.
*H04M 3/523* (2006.01)
*G06N 20/00* (2019.01)

(58) Field of Classification Search
USPC ....... 379/265.01–265.14, 266.01–266.1, 309
See application file for complete search history.

(56) References Cited

U.S. PATENT DOCUMENTS

| | | |
|---|---|---|
| 10,609,156 B2 | 3/2020 | Twombly et al. |
| 11,076,047 B1 | 7/2021 | Clodore et al. |
| 11,228,624 B1 | 1/2022 | Oueslati et al. |
| 2003/0212626 A1* | 11/2003 | Vulkan .................. G06Q 30/02 705/37 |
| 2005/0071241 A1* | 3/2005 | Flockhart ............ H04M 3/5233 705/26.1 |
| 2010/0195535 A1 | 8/2010 | Ziller et al. |
| 2016/0380892 A1 | 12/2016 | Mahadevan et al. |
| 2019/0065948 A1* | 2/2019 | Henry .................. G06Q 30/016 |
| 2019/0132451 A1* | 5/2019 | Kannan ............... H04M 3/5235 |
| 2021/0350385 A1 | 11/2021 | Ellison et al. |
| 2023/0139628 A1* | 5/2023 | An ...................... G06F 16/3329 705/304 |

* cited by examiner

MODEL-BASED COMMUNICATION ROUTING SYSTEM AND METHOD

CROSS-REFERENCE TO RELATED APPLICATIONS

This application is a continuation of U.S. patent application Ser. No. 17/538,488, entitled "MODEL-BASED COMMUNICATION ROUTING SYSTEM AND METHOD," filed Nov. 30, 2021, which is herein incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

The present disclosure relates generally to communication routing (e.g., call routing) using machine learning techniques and communication routing models associated with various product or service goals.

As automated systems become more sophisticated and reliance on human customer service representatives decreases, automated communication center systems (e.g., automated call center systems) may perform an increasing number of functions. Unfortunately, this increase in functionality may create navigation difficulties, as communication routing trees (e.g., navigation paths to particular desired functions for the communication) may become extremely complex, hindering a customer's (e.g., caller's) ability to reach the desired function in an efficient manner. Further, some functions handled by these systems, when not handled in an efficient manner, may lead to increased stress of the customer, inability to complete transactions, and other undesirable experiences. Accordingly, it is now recognized that improved communication routing systems (e.g., call routing systems) and methods are desired.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer-implemented method includes receiving, at one or more processors, data indicative of a customer communication, inputting, via the one or more processors, the data to a first communication routing model corresponding to a first product or service goal associated with one or more product or service types, and determining, via the one or more processors and based on the first communication routing model, a first score corresponding to a first likelihood that the customer communication will satisfy the first product or service goal. The computer-implemented method also includes inputting, via the one or more processors, the data to a second communication routing model different than the first communication routing model and corresponding to a second product or service goal associated with the one or more product or service types, and determining, via the one or more processors and based on the second communication routing model, a second score corresponding to a second likelihood that the customer communication will satisfy the second product or service goal. The computer-implemented method also includes routing, via the one or more processors, the customer communication to a member service representative group based on a comparison of the first score with the second score or a first weighted score derived from the first score with a second weighted score derived from the second score.

In one embodiment, one or more tangible, non-transitory, computer readable media stores instructions thereon that, when executed by at least one processor, are configured to cause the at least one processor to perform various functions. The various functions include receiving data indicative of a customer communication, inputting the data to a communication routing model corresponding to a product or service goal associated with a product or service type, and determining, via the communication routing model, a score corresponding to a likelihood that the customer communication will satisfy the product or service goal associated with the product or service type. The various functions also include routing, based on an analysis of the score, the customer communication to a member service representative group, determining an outcome of the customer communication with the member service representative group, and updating the communication routing model based on additional data indicative of the outcome.

In one embodiment, one or more tangible, non-transitory, computer readable media stores instructions thereon that, when executed by at least one processor, are configured to cause the at least one processor to perform various functions. The various functions include receiving data indicative of a customer communication, inputting the data to a first communication routing model corresponding to a first product or service goal, and determining, based on the first communication routing model, a first score indicative of a first likelihood that the customer communication will satisfy the first product or service goal. The various functions also include inputting the data to a second communication routing model corresponding to a second product or service goal different than the first product or service goal, determining, based on the second communication routing model, a second score corresponding to a second likelihood that the customer communication will satisfy the second product or service goal, and determining that the first score is greater than the second score (or that a first weighted score derived from the first score is greater than a second weighted score derived from the second score). The various functions also include selecting, from a first member service representative group corresponding to the first communication routing model and a second member service representative group corresponding to the second communication routing model, the first member service representative in response to determining that the first score is greater than the second score (or that the first weighted score is greater than the second weighted score). The various functions also include routing, based on the selection of the first member service representative group, the customer communication to the first member service representative group.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
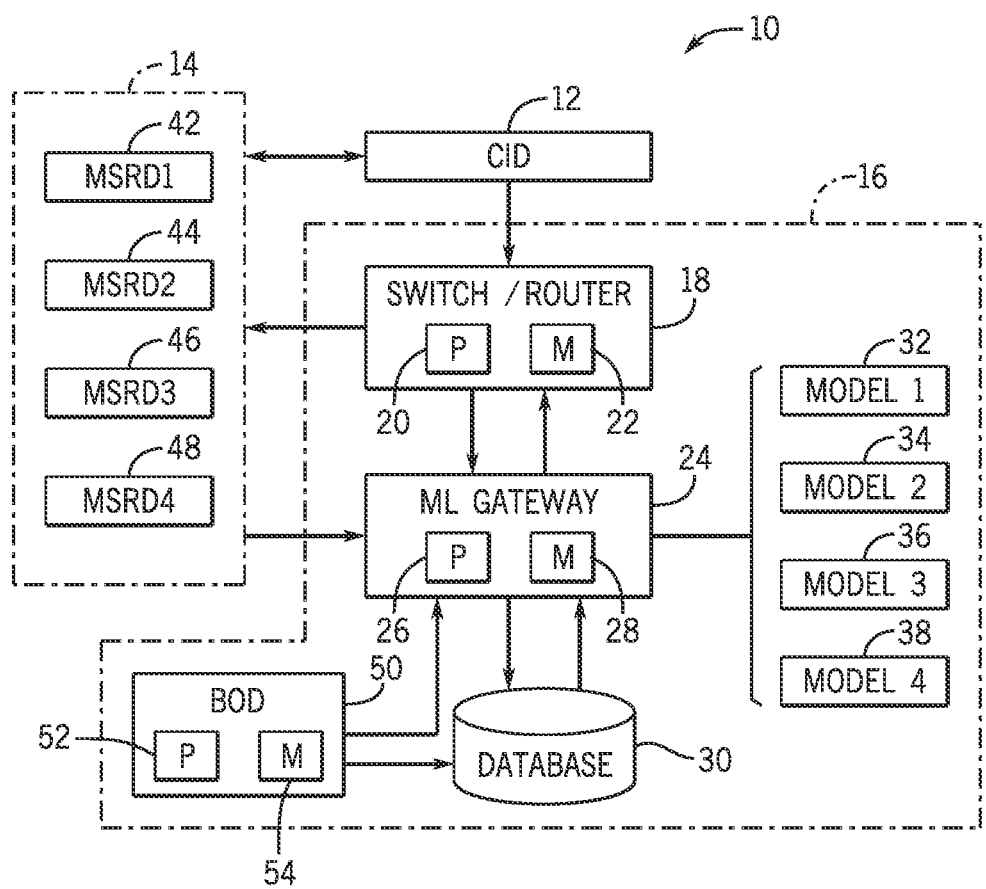
FIG. 1 is a schematic illustration of a system that interfaces a customer interface device with a member service representative device via a model-based communication routing system, in accordance with an aspect of the present disclosure.

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are generally directed toward communication routing (e.g., call routing) using machine learning techniques and communication routing models associated with various product or service goals. More particularly, present embodiments are directed toward assessing and routing a customer communication via multiple communication routing models, each of which corresponding to a particular product or service goal, and updating one or more of the communication routing models based on an outcome of the customer communication.

In accordance with the present disclosure, a computer-implemented method includes receiving a customer communication and inputting data indicative of the customer communication to a number of communication routing models. In embodiments configured to receive customer phone calls, a switch or router may receive the phone call and employ an automated questionnaire configured to solicit information from the customer regarding the customer communication. In embodiments configured to receive text-based messages (e.g., text messages, emails, or messages sent via a communication portal in a mobile or desktop application), the customer may execute a form that solicits information from the customer regarding the customer communication. In this way, data indicative of the customer communication may include data obtained directly from the customer communication (e.g., a name or account of the customer, a reason for the customer communication, a product or service associated with the communication, and other characteristics), such as through speech or text recognition software. Additionally, the data indicative of the customer communication may include data obtained from a separate source (e.g., recent activity of the customer, products or services owned or held by the customer, and the like), such as from a database storing a customer account thereon. The data indicative of the customer communication may be input to various communication routing models as described in detail below.

Each communication routing model may correspond to a particular product or service goal. For example, a first communication routing model may correspond to the product or service goal of increasing sales (e.g., by a threshold amount), and a second communication routing model may correspond to the product or service goal of communication resolution (e.g., resolving a reason for the customer communication within a threshold amount of time). The data indicative of the customer communication may be input to the first and second communication routing models, which produce first and second scores, respectively, indicating a likelihood that the product or service goals corresponding to the communication routing models will be met.

In some embodiments, each communication routing model may correspond to a particular product or service type. For example, a first communication routing model may correspond to credit cards and a second communication routing model may correspond to insurance. Certain embodiments in accordance with the present disclosure may employ communication routing models characterized by both product or service goals and product or service types. For example, a first communication routing model may correspond to the product or service goal of increasing sales (e.g., by a threshold amount) for the product or service type of credit cards, a second communication routing model may correspond to the product or service goal of communication resolution (e.g., resolving a reason for the customer communication within a threshold amount of time) for the product or service type of credit cards, a third communication routing model may correspond to the product or service goal of communication resolution for the product or service type of insurance, and a fourth communication routing model may correspond to the product or service goal of increasing sales for the product or service type of insurance.

As noted above, the data indicative of the customer communication may be input to each communication routing model, and each communication routing model may produce a score indicating, for example, a likelihood that the product or service goal will be met (e.g., satisfied by the customer communication). The various scores produced by the various communication routing models may be analyzed (e.g., compared) to determine a member service representative group to which the customer communication is routed. For example, the customer communication may be routed to a member service representative group corresponding to the communication routing model (or product or service goal thereof) having the highest score output by the various communication routing models. In some embodiments, each communication routing model may produce a raw score indicative of a likelihood that the corresponding product or service goal will be met (e.g., satisfied by the customer communication), and various business priority weights may be applied to the raw scores. For example, a first communication routing model corresponding to the product or service goal of increasing sales (e.g., by a threshold amount) may produce a first raw score, and a first weight (e.g., indicative of a priority of increasing sales) may be applied to the first score to produce a first weighted score. A second communication routing model corresponding to the product or service goal of communication resolution (e.g., resolving a reason for the customer communication within a threshold amount of time) may produce a second raw score, and a second weight (e.g., indicative of a priority of communication resolution) may be applied to the second score to produce a second weighted score. The customer communication may be routed to a member service representative group corresponding to the communication routing model having the higher weighted score.

It should be noted that the business priority weights may be modified to reflect changes in business priorities. For example, during a natural disaster, communication resolution may be prioritized by the business over increasing sales and, thus, the corresponding business priority weights may be modified by the business to reflect that communication resolution is more important than increasing sales. In this way, the customer communication may be routed to a member service representative group corresponding to a particular communication routing model (e.g., corresponding to communication resolution) even if another communication routing model (e.g., corresponding to increasing sales) produces a higher raw score.

In accordance with the present disclosure, an outcome of the customer communication with the member service representative group may be determined and utilized to adjust one or more of the communication routing models. For example, a customer communication may be routed to a member service representative group corresponding to a communication routing model associated with the product or service goal of increasing sales (e.g., by a threshold amount). Data indicative of the outcome of the customer communication may include information relating to whether the product or service goal of increasing sales (e.g., by a threshold amount) was satisfied by the customer communication with the member service representative group. In some embodiments, the customer communication with the member service representative group may be assessed an outcome score over a range of outcome scores, including at least a first score indicating that the product or service goal was completely satisfied (e.g., sales exceeding a threshold amount), a second score indicating that the product or service goal was partially satisfied (e.g., sales that do not exceed the threshold amount, or that exceed a minimum threshold amount but do not exceed a target threshold amount), and a third score indicating that the product or service goal was completely unsatisfied (e.g., no sales). The outcome score may be employed to modify one or more of the communication routing models.

It should be noted that the product or service types (and corresponding communication routing models) may include credit cards and insurance, as described above, and a range of other product or service types, such as retail products (e.g., goods), bank accounts, debit cards, investment accounts, retirement accounts, and the like. Further, it should be noted that the product or service goals (and corresponding communication routing models) may include increased sales and communication resolution, as described above, and a range of other product or service goals, such as customer retention, account transfers, reduced call backs, customer satisfaction, reduced customer stress, reduced call transfers, and the like. These and other features are described in detail below with reference to the drawings.

FIG. 1 is a schematic illustration of an embodiment of a system 10 that interfaces a customer interface device 12 with a communication center 14 via a model-based communication routing system 16. For example, the customer interface device 12 may include a network-connected device, such as a phone (e.g., mobile phone, cellular phone, smartphone, landline) or computer (e.g., personal computer, laptop), utilized by a customer to contact a business operating the communication center 14 and/or the model-based communication routing system 16. The customer communication may be received by a switch 18 (or "router") having a processor 20 and a memory 22. The switch 18 may execute text or speech recognition software that determines various characteristics associated with the customer communication received from the customer interface device 12. Data indicative of the customer communication may be transmitted from the switch 18 to a model-based machine learning gateway 24 (referred to in certain instances below as "the gateway 24") including a processor 26 and a memory 28. Such data may include various information obtained directly from the customer communication, such as a name of the customer, an account number of the customer, an age and other identifying information regarding the customer, a reason for the customer communication, a product or service type associated with the communication, and other characteristics. The switch 18 may also transmit to the gateway 24 a request for a communication routing recommendation.

In addition to receiving from the switch 18 the above-described data directly obtained from the customer communication, the gateway 24 may request and/or receive data indicative of the customer communication from other sources, such as a database 30. For example, the database 30 may include a customer account associated with the customer that utilized the customer interface device 12 to transmit the customer communication. The customer account may include various information relating to the customer, such as products or services owned or held by the customer, recent activity of the customer (e.g., customer activity associated with the business), and the like. Other sources from which the gateway 24 may receive data related to the customer communication includes social media accounts associated with the customer.

The gateway 24 may input the above-described data (e.g., data received from the switch 18, data received from the database 30, and any other data received by the gateway 24) into a number of communication routing models, such as a first model 32, a second model 34, a third model 36, and a fourth model 38. Each communication routing model 32, 34, 36, 38 may be associated with a particular product or service goal, a particular product or service type, or a combination thereof. For example, the first communication routing model 32 may correspond to the product or service goal of increasing sales (e.g., by a threshold amount) for the product or service type of credit cards, the second communication routing model 34 may correspond to the product or service goal of communication resolution (e.g., resolving a reason for the customer communication within a threshold amount of time) for the product or service type of credit cards, the third communication routing model 36 may correspond to the product or service goal of communication resolution for the product or service type of insurance, and the fourth communication routing model 38 may correspond to the product or service goal of increasing sales for the product or service type of insurance. It should be noted that the above-described product or service goals and product or service types are merely examples. Other examples of product or service goals may include customer retention, customer satisfaction, reduced customer stress, reduced call transfers, and the like. Other examples of product or service types may include retail products (e.g., goods), bank accounts, debit cards, investment accounts, retirement accounts, and the like Each of the communication routing models 32, 34, 36, 38 may produce a score indicative of a likelihood that the respective product or service goal will be met or satisfied. For example, the first communication routing model 32 may output a first score corresponding to a likelihood that the customer communication will result in increased credit card sales (e.g., by a threshold amount), the second communication routing model 34 may output a second score corresponding to a likelihood that the customer communication will result in a positive, satisfactory, or favorable resolution of a credit card-related reason for the customer communication (e.g., within a threshold amount of time), the third communication routing model 36 may output a third score corresponding to a likelihood that the customer communication will result in a positive, satisfactory, or favorable resolution of an insurance-related reason for the customer communication, and the fourth communication routing model 38 may output a fourth score corresponding to a likelihood that the customer communication will result in increased insurance sales.

The first score, the second score, the third score, and the fourth score may be analyzed (e.g., compared to each other) by the gateway 24 to determine a communication routing recommendation transmitted to the switch 18. For example, the gateway 24 may determine that the first score, corresponding to a likelihood that the customer communication will result in increased credit card sales, is the highest. In response to determining that the first score is the highest, the gateway 24 may recommend to the switch 18 that the customer communication be routed to an appropriate member service representative group at the communication center 14. For example, the communication center 14 may include a first member service representative group (e.g., represented in FIG. 1 by a first member service representative device 42 corresponding to the first model 32), a second member service representative group (e.g., represented in FIG. 1 by a second member service representative device 44 corresponding to the second model 34), a third member service representative group (e.g., represented in FIG. 1 by a third member service representative device 46 corresponding to the third model 36), and a fourth member service representative group (e.g., represented in FIG. 1 by a fourth member service representative device 48 corresponding to the fourth model 38). The devices 42, 44, 46, 48 may include, for example, a phone (e.g., mobile phone, cellular phone, smartphone, landline) or computer (e.g., personal computer, laptop). After receiving the call routing recommendation from the gateway 24, the switch 18 may connect the customer interface device 12 with the recommended member service representative group (e.g., device 42, device 44, device 46, or device 48).

In some embodiments, the models 32, 34, 36, 38 may output or determine raw scores corresponding to a likelihood that the customer communication will result in the respective product or service goals associated with the models 32, 34, 36, 38 will be satisfied, where the raw scores are then weighted to determine weighted scores analyzed by the gateway 24 in order to determine the above-described communication routing recommendation. Indeed, for various reasons, the business receiving the customer communication may prioritize certain product or service goals, certain product or service types, or both based on transient business needs. As an example, during a natural disaster, communication resolution may be prioritized over increasing sales, and insurance may be prioritized over credit cards. A business operation device 50 including a processor 52 and a memory 54 may be employed to modify the weights applied by the gateway 24 to the raw scores output by the models 32, 34, 36, 38. In this way, in certain conditions, the gateway 24 may recommend that the switch 18 route the customer communication to the second member service representative device 44 corresponding to the second model 34 despite the first model 32 corresponding to the first member service representative device 42 outputting or determining a higher raw score than the second model 34. In other words, while the first raw score output or determined via the first model 32 may be higher than the second raw score output by the second model 34, the first weighted score (calculated by applying a first weight to the first raw score) may be less than the second weighted score (calculated by applying a second weight to the second raw score).

After the customer communication is received at the communication center 14 (e.g., via the first member service representative device 42, the second member service representative device 44, the third member service representative device 46, or the fourth member service representative device 48), and after the customer communication is concluded, communication outcome data may be received by the gateway 24 (e.g., from the communication center 14). The communication outcome data may include, for example, an indication regarding whether the product or service goal associated with the communication routing recommendation was met or satisfied. In some embodiments, the indication may include a score regarding an extent to which the product or service goal was met or satisfied.

As an example, the product or service goal associated with a communication routing recommendation may include increased sales (e.g., credit card sales). The communication outcome data may include a first score indicating that the customer communication concluded with credit card sales exceeding a threshold (e.g., completely satisfied product or service goal), a second score indicating that the customer communication concluded with credit card sales less than the threshold or between an upper threshold and a lower threshold (e.g., partially satisfied product or service goal), or a third score indicating that the customer communication concluded with no credit card sales (e.g., unsatisfied product or service goal). As another example, the product or service goal associated with a communication routing recommendation may include communication resolution (e.g., insurance related communication resolution). The communication outcome data may include a first score indicating that the customer communication concluded with a positive, satisfactory, or favorable resolution within a threshold amount of time (e.g., completely satisfied product or service goal), a second score indicating that the customer communication concluded with a positive, satisfactory, or favorable resolution that took longer than the threshold amount of time or between an upper threshold amount of time and a lower threshold amount of time (e.g., partially satisfied product or service goal), or a third score indicating that the customer communication concluded with no positive, satisfactory, or favorable resolution (e.g., unsatisfied product or service goal). In some embodiments, the communication outcome data may include an indication of whether the customer communication was transferred (e.g., from the first member service representative device 42 corresponding to the first model 32 to the second member service representative device 44 corresponding to the second model 34).

Based on the communication outcome data received by the gateway 24 (e.g., from the communication center 14), the gateway 24 (or another processing component) may modify or alter one or more of the models 32, 34, 36, 38. An extent of modification or alteration of one or more of the models 32, 34, 36, 38 may depend on the above-described communication outcome scores. In this way, the gateway 24 may employ machine learning (or artificial intelligence) algorithms to tune the models 32, 34, 36, 38 for future use. As a volume of customer communications handled by the model-based communication routing system 16 increases (and, thus, communication data outcome data increases), the models 32, 34, 36, 38 executed by the gateway 24 may be tuned for higher accuracy and improved communication routing recommendations.

It should be noted that, in some embodiments, the models 32, 34, 36, 38 are automatically updated based on the communication outcome data. For example, as noted above, the communication outcome data may be transmitted to the gateway 24 (e.g., from the communication center 14, such as from the member service representative device 42 of the communication center 14), and the gateway 24 may automatically update one or more of the models 32, 34, 36, 38 based on the communication outcome data. In other embodiments, one or more of the models 32, 34, 36, 38 may be updated manually by an operator. For example, an operator may utilize the business operation device 50, described above with respect to modifying various business priority weights, to manually adjust the models 32, 34, 36, 38 based on an analysis of the communication outcome data. In some embodiments, a component (e.g., a device having a processor) separate from the business operation device 50 and separate from the communication center 14 may be utilized to manually update the models 32, 34, 36, 38.

It should be noted that, in some embodiments, the gateway 24 (or another processing component) may employ multiple instances of the processor 26 and memory 28. That is, multiple processors and memories may be utilized to perform the above-described functions. In one example, a first instance of the processor 26 and the memory 28 may be employed to execute the various models 32, 34, 36, 38, a second instance of the processor 26 and the memory 28 may be employed to modify the various models 32, 34, 36, 38 based on the above-described communication outcome data, and a third instance of the processor 26 and the memory 28 may be employed to apply business priority weights to raw scores determined via one or more of the models 32, 34, 36, 38. In general, the communication routing system 16 enables improved communication routing recommendations that improve a business's ability to achieve product or service goals and improve customer satisfaction.

Further, it should be noted that, in some embodiments, the business priority weights may be stored in the database 30. For example, the business priority weights may be retrieved by the gateway 24 (or some other processor) from the database 30 and applied to the raw scores produced via the various models 32, 34, 36, 38 described above. In certain such embodiments, the business operation device 50 may be utilized (e.g., by the business) to update or modify the business priority weights stored in the database 30. Other data utilized to execute the models 32, 34, 36, 38 may also be stored in the database 30 and retrieved by the gateway 24, such as data utilized for mapping which of the models 32, 34, 36, 38 pertain to a given product or service type (e.g., for determining the product or service type associated with a particular customer communication, and then executing the appropriate one or ones of the models 32, 34, 36, 38).

Further still, it should be noted that, in some embodiments, the system 10 may employ a timer or some other mechanism that ensures an end-to-end process of receiving the customer communication, determining a communication routing recommendation, and transferring the customer communication to the communication center 14 (e.g., to one of the member service representative devices 42, 44, 46, 48) does not exceed a predefined duration of time. In doing so, a customer experience may be improved by ensuring that the customer is not on hold for longer than the predefined duration of time. Additionally or alternatively, the system 10 may employ a timeout (e.g., system processing threshold) strategy that ensures the customer communication will be transferred to the communication center 14 (e.g., to one of the member service representative devices 42, 44, 46, 48) once the predefined duration of time has lapsed. If the predefined duration of time has lapsed before the gateway 24 has generated a communication routing recommendation, a customer is transferred to a human operator via default routing logic, thus improving the customer experience over traditional embodiments that do not monitor a communication routing time.

Additionally or alternatively, the system 10 may employ a system caching strategy (e.g., pertaining to data retrieval between the gateway 24 and the database 30) to improve system performance of retrieving data from the database 30, in order to improve the likelihood of determining a communication routing recommendation within the predefined duration of time. As a non-limiting example, data including business priority weights and mapping of which models pertain to a given product or service type may be cached (e.g., at the gateway 24), such that retrieval of such data is faster than directly retrieving the data from the database 30, ultimately enabling the gateway 24 to more quickly recommend a communication routing selection and providing the recommendation to the router/switch 18 within the above-described predefined duration of time. The system 10 may also be capable of scaling the computing and memory resources in real-time or near real-time to handle transient customer communication volume. For example, if customer communication volume is relatively low, the system 10 may employ a relatively small amount of computing (e.g., processing) and memory resources, whereas if customer communication volume is relatively high, the system 10 may employ a relatively large amount of computing (e.g., processing) and memory resources.

Figure 2:
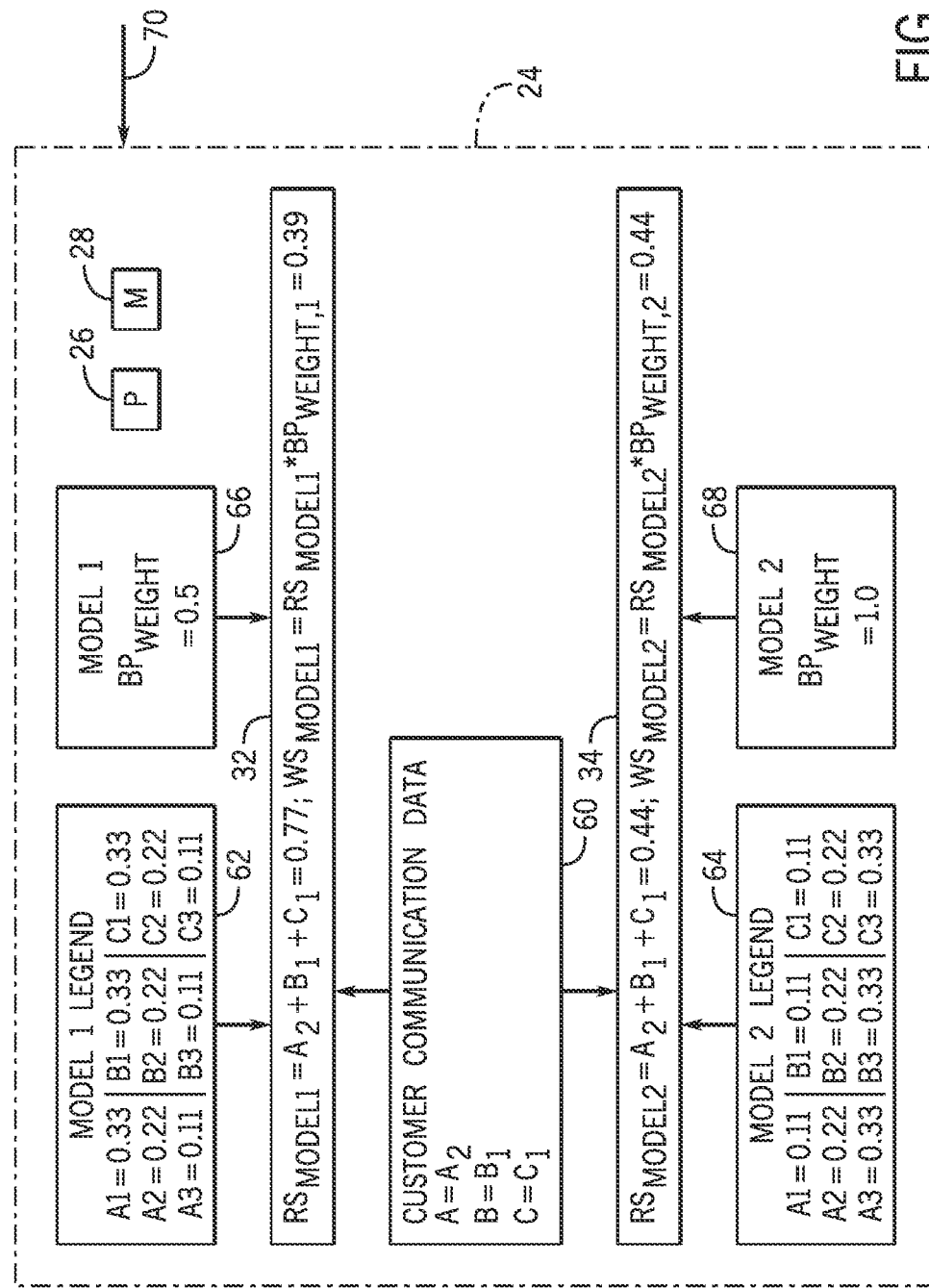
FIG. 2 is a schematic illustration of a model-based machine learning gateway employed in the model-based communication routing system of FIG. 1, in accordance with an aspect of the present disclosure.

FIG. 2 is a schematic illustration of an embodiment of the model-based machine learning gateway 24 (or "gateway 24") employed in the model-based communication routing system 16 of FIG. 1. In the illustrated embodiment, the gateway 24 includes the processor 26 and the memory 28, where the memory 28 includes instructions thereon that, when executed by the processor 26, cause the processor 26 to perform various functions.

For example, the gateway 24, via the processor 26, may execute various communication routing models to determine a communication routing recommendation for a customer communication. In the illustrated embodiment, the gateway 24 executes the first communication routing model 32 (e.g., corresponding to the product or service type of credit cards and the product or service goal of increased sales) and the second communication routing model 34 (e.g., corresponding to the product or service type of credit cards and the product or service goal of communication resolution). Each of the models 32 and 34 may receive as inputs various customer communication data 60. For example, the customer communication data 60 may include various characteristics, denoted in the illustrated embodiment as characteristic A, characteristic B, and characteristic C. As an example, characteristic A may relate to products or services owned or held by the customer with the business (e.g., credit card, insurance policy, or retirement account), characteristic B may relate to recent activity of the customer with the business (e.g., recently paid credit card balance, recent credit card expenditure, recent missed credit card payment), and characteristic C may relate to a mechanism of the customer communication (e.g., text message, message through mobile or desktop application communication portal, or phone call). In the illustrated embodiment, characteristic A of the customer communication data 60 includes $A_2$ (e.g., indicating the customer holds a credit card with the business), characteristic B of the customer communication data 60 includes $B_1$ (e.g., indicating the customer recently paid a portion of the credit card debt or balance), and characteristic C of the customer communication data 60 includes $C_1$ (e.g., indicating the customer communication is a phone call).

The first model 32 may include a first legend 62 storing numerical values for each possible characteristic A, B, and C (e.g., $A_1$, $A_2$, $A_3$, $B_1$, $B_2$, $B_3$, $C_1$, $C_2$, $C_3$). Likewise, the second model 34 may include a second legend 64 storing numerical values for each possible characteristic A, B, and C (e.g., $A_1$, $A_2$, $A_3$, $B_1$, $B_2$, $B_3$, $C_1$, $C_2$, $C_3$). As shown, the numerical values between the first legend 62 and the second legend 64 may differ. In the illustrated embodiment, the first model 32 produces, based on the combination of $A_2$, $B_1$, and $C_1$ from the customer communication data 60, a raw score of 0.77. The second model 34 produces, based on the combination of $A_2$, $B_1$, and $C_1$ from the customer communication data 60, a raw score of 0.44. Thus, the first raw score produced by the first model 32 is higher than the second raw score produced by the second model 34. In some embodiments, the gateway 24 may recommend communication routing to a first member service representative group corresponding to the first model 32 based on the determination that the first raw score is higher than the second raw score. In other embodiments, business priority weights may be applied to the first raw score and the second raw score. For example, in the illustrated embodiment, a first business priority weight 66 stored for the first model 32 is 0.5, and a second business priority weight 68 stored for the second model 34 is 1.0 (i.e., indicating that the business currently prioritizes the product or service goal of the second model 34, corresponding to communication resolution, over the product or service goal of the first model 32, corresponding to increased sales).

After applying the first and second business priority weights 66, 68, the first model 32 produces a first weighted score of approximately 0.39, and the second model 34 produces a second weighted score of approximately 0.44. Thus, the second weighted score (e.g., produced by the second model 34) is higher than the first weighted score (e.g., produced by the first model 32). The gateway 24 may recommend communication routing to a second member service representative group corresponding to the second model 34 based on the determination that the second weighted score is higher than the first weighted score.

As previously described, the gateway 24 (or a separate processing component) may receive communication outcome data 70 that can be used to alter, adjust, or otherwise modify the first model 32 and the second model 34. For example, the numerical values in the first legend 62, the second legend 64, or both may be modified based on the communication outcome data 70. Further, in some embodiments, the business priority weights 66, 68 may be altered, adjusted, or otherwise modified based on various business priorities, such as handling a natural disaster, a need to increase sales toward the end of a fiscal year or quarter, etc. Further still, in some embodiments, the communication outcome data 70 may also be utilized to automatically adjust the business priority weights 66, 68. In this way, the first model 32 and the second model 34 may be tuned (e.g., for accuracy) as a volume of the communication outcome data 70 increases. Tuning of the first model 32 and the second model 34 may improve the business' ability to achieve product or service goals and customer satisfaction.

Figure 3:
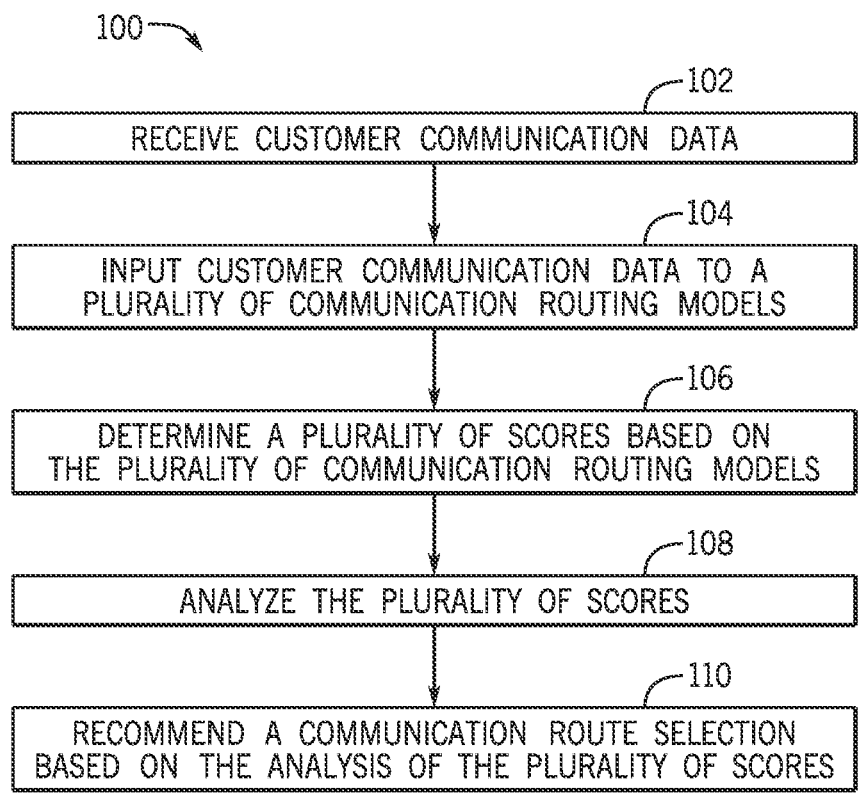
FIG. 3 is a process flow diagram illustrating a method of routing a communication via the model-based communication routing system of FIG. 1, in accordance with an aspect of the present disclosure.

FIG. 3 is a process flow diagram illustrating an embodiment of a method 100 of routing a communication via the model-based communication routing system of FIG. 1. In the illustrated embodiment, the method 100 includes receiving (block 102) customer communication data (e.g., at a processor). For example, as previously described, a switch or router may receive a customer communication, such as a customer phone call, a customer text-based message (e.g., text message, email, mobile or desktop application portal message). In embodiments of the switch or router configured to receive a customer phone call, an automated questionnaire may be employed to solicit information from the customer regarding the customer communication. In embodiments employing text-based messages, the customer may include in the customer communication information related to the customer communication. In either embodiment, the data indicative of the customer communication may include, for example, identifying information of the customer (e.g., name and age), products or services owned or held by the customer, a reason for the customer communication, a product or service related to the customer communication, and the like. The customer communication data may be transmitted from the switch to a model-based machine learning gateway (referred to below as "the gateway").

In some embodiments, additional data indicative of the customer communication may include data that is not directly derived from the customer communication itself. For example, a database storing a customer account associated with the customer communication may include information transmitted to the gateway and related to the customer communication (e.g., recent activity of the customer, such as online activity). The additional data indicative of the customer communication may be transmitted to the gateway from, for example, a database storing a customer account thereon.

The method 100 also includes inputting (block 104) the customer communication data to a number of communication routing models (e.g., via the processor). For example, the gateway may enter the customer communication data to a first communication routing model corresponding to the product or service goal of increasing sales and the product or service type of credit cards. The gateway may also enter the customer communication data to a second communication routing model corresponding to the product or service goal of communication resolution and the product or service type of credit cards. As previously described, any number of communication routing models corresponding to any number of product or service goals and product or service types may be employed.

The method 100 also includes determining (block 106) a number of communication routing scores corresponding to the number of communication routing models. Each communication routing model may produce a raw score indicating a likelihood that the corresponding product or serviced goal will be met or achieved at a conclusion of the customer communication. In some embodiments, the raw scores produced by the various communication routing models may be directly analyzed to determine a communication routing recommendation. In other embodiments, business priority weights may be applied to the raw scores to generate weighted scores associated with each communication routing model. As previously described, the business priority weights may be set by the business and based on transient business needs, such as responding to a natural disaster. Accordingly, as transient business needs change over time, the business priority weights may be modified.

The method 100 also includes analyzing (block 108) the number of communication routing scores. That is, the gateway may compare the communication routing scores (e.g., raw scores or weighted scores). In some embodiments, the gateway may merely determine which of the communication routing scores (e.g., raw scores or weighted scores) is the highest.

The method 100 also includes recommending (block 110) a communication route selection based on the analysis of the number of communication routing scores. For example, as previously described, the gateway may determine which of the communication routing scores (e.g., raw scores or weighted scores) is the highest. After determining the highest communication routing score (e.g., highest raw score or highest weighted score), the gateway may recommend to the switch that the switch route the customer communication to a member service representative group (or member service representative device) corresponding to the product or service goal associated with the communication routing model having the highest communication routing score. For example, if the highest score belongs to the first communication routing model corresponding to the product or service goal of increasing sales and the product or service type of credit cards, the gateway may recommend to the switch that the customer communication be routed to the member service representative group (or device thereof) corresponding to credit card sales.

Figure 4:
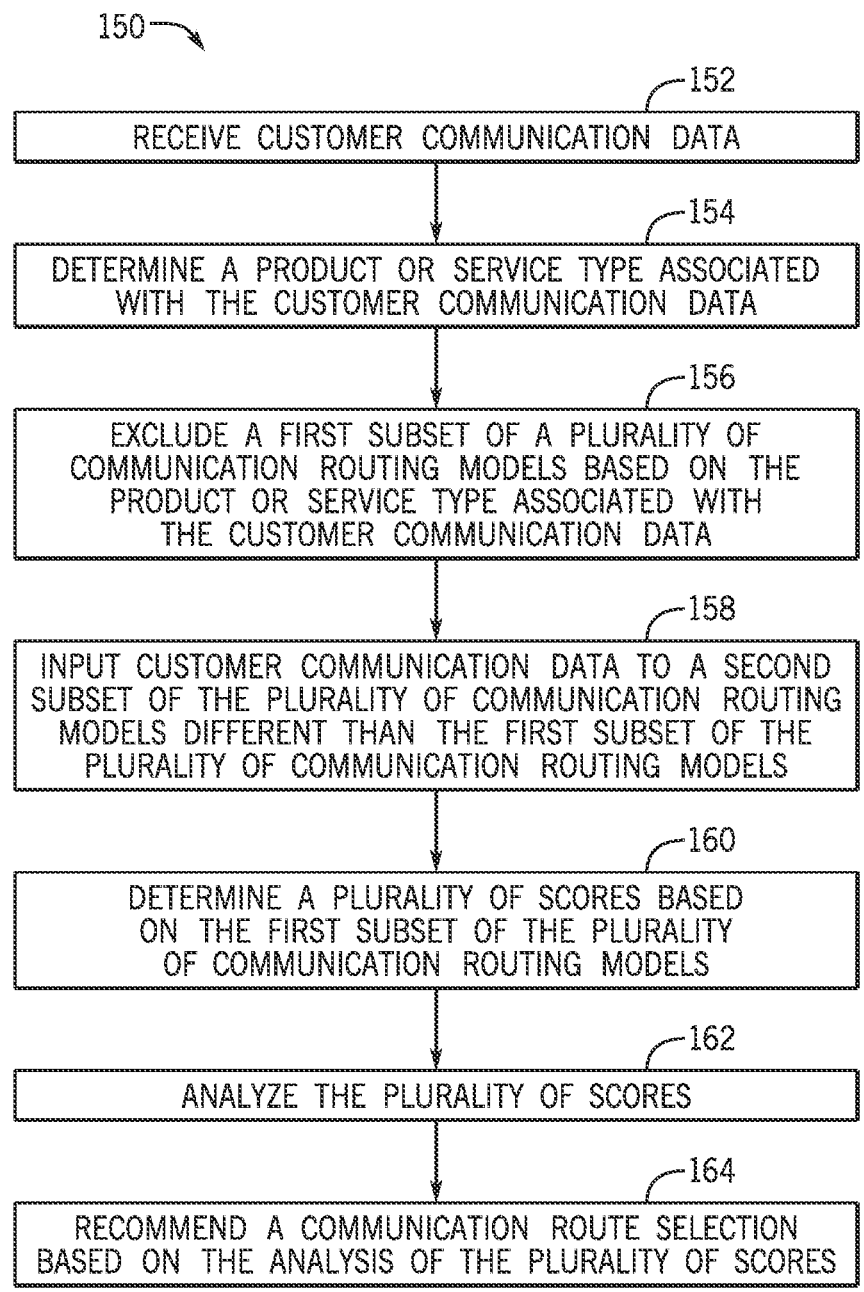
FIG. 4 is a process flow diagram illustrating another method of routing a communication via the model-based communication routing system of FIG. 1, in accordance with an aspect of the present disclosure.

FIG. 4 is a process flow diagram illustrating an embodiment of another method 150 of routing a communication via the model-based communication routing system of FIG. 1. In the illustrated embodiment, the method 150 includes receiving (block 152) customer communication data (e.g., at a processor). Block 152 in FIG. 4 is the same as, or similar to, block 102 in FIG. 3.

The method 150 also includes determining (block 154) a product or service type associated with the customer communication data. For example, the customer communication data may indicate that the customer communication relates to the product or service type of credit cards.

The method 150 also includes excluding (block 156) a first subset of communication routing models based on the product or service type associated with the customer communication data. For example, as previously described, communication routing models may correspond to various product or service goals and various product or service types. Certain of the communication routing models may correspond to the product or service type of credit cards, for example, while certain other communication routing models may correspond to the product or service type of insurance. In FIG. 4, the switch or the gateway may determine that the customer communication data indicates the customer communication as relating to credit cards. Based on this determination, the gateway may exclude processing of communication routing models that correspond to insurance (i.e., the first subset of communication routing models). By excluding certain communication routing models (e.g., those that are inapplicable to the customer communication), processing of the customer communication may reduced and the customer communication may be more quickly routed to the appropriate location. Accordingly, such exclusion may improve customer satisfaction (e.g., through a reduced amount of time required to route the customer communication to an appropriate location) and improve a likelihood that the customer communication is resolved favorably and consistent with the business' product or service goals.

The method 150 also includes inputting (block 158) the customer communication data to a second subset of communication routing models different than the first subset of communication routing models. The second subset of communication routing models may be those that are applicable to the identified product or service type associated with the customer communication. For example, as previously described, the switch or gateway may identify the customer communication as relating to credit cards. Accordingly, the second subset of communication routing models may all apply to credit cards.

The method 150 also includes determining (block 160) a number of communication routing scores corresponding to the first subset of the communication routing models. For example, as previously described, the communication routing models may each apply to a particular product or service goal. A first communication routing model may correspond to the product or service goal of increased sales (e.g., for credit cards), and a second communication routing model may correspond to the product or service goal of communication resolution (e.g., for credit cards). The first communication routing model may produce a first score and the second communication routing model may produce a second score. As previously described, in some embodiments, first and second raw scores may be produced by the first and second communication routing models, respectively, where business priority weights are then applied to the first and second raw scores. In other embodiments, no business priority weights may be applied.

The method 150 also includes analyzing (block 162) the number of communication routing scores. For example, as previously described, the communication routing scores may correspond to raw scores output by the communication routing models, or to weighted scores derived from the raw scores. The scores may be compared with one another to determine a highest score (e.g., highest raw score or highest weighted score).

The method 150 also includes recommending (block 164) a communication route selection based on the analysis of the number of communication routing scores. That is, after the gateway determines the highest score (e.g., highest raw score or highest weighted score) and the communication routing model corresponding to the highest score, the gateway may recommend to the switch that the customer communication be routed to a member service representative group (or device) corresponding to the product or service goal associated with the communication routing model having the highest score. In one example, the communication routing model having the highest score may correspond to the product or service goal of increased sales (e.g., for credit cards). Accordingly, the gateway may recommend to the switch that the customer communication be routed to a member service representative group (or device) corresponding to credit card sales.

Figure 5:
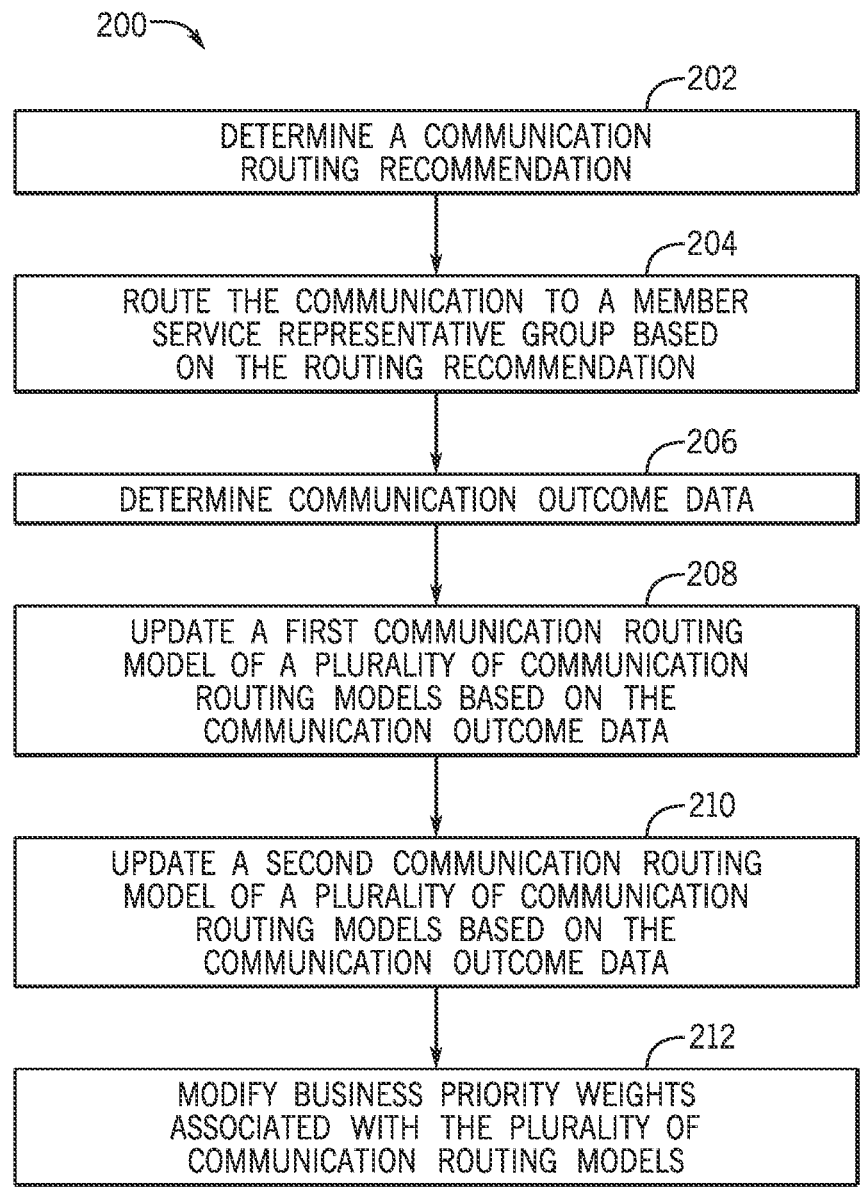
FIG. 5 is a process flow diagram illustrating a method of modifying various communication routing models employed in the model-based communication routing system of FIG. 1, in accordance with an aspect of the present disclosure.

FIG. 5 is a process flow diagram illustrating a method 200 of modifying various communication routing models employed in the model-based communication routing system of FIG. 1. It should be noted that the method 200 illustrated in FIG. 5 and described in detail below may take place in conjunction with the method 100 illustrated in FIG. 3 and/or the method 150 illustrated in FIG. 4. In the illustrated embodiment, the method 200 includes determining (block 202) a communication routing recommendation. For example, block 202 in FIG. 5 may involve the processing steps illustrated in blocks 102-110 of FIG. 3, or the processing steps illustrated in blocks 152-164 of FIG. 4.

The method 200 also includes routing (block 204) the communication to a member service representative group based on the routing recommendation at block 202. For example, as previously described, the routing recommendation may be based on a determination regarding the likelihood that particular product or service goals (e.g., for particular product or service types) may be met or achieved via the customer communication. In one embodiment, the product or service goal of increased sales (e.g., for credit cards) may be more likely to be achieved than other product or service goals. Accordingly, the customer communication may be routed to the member service representative group (i.e., a member service representative device) corresponding to credit card sales. In another embodiment, the product or service goal of account transfer (e.g., for credit cards) may be more likely to be achieved than other product or service goals. Accordingly, the customer communication may be routed to the member service representative group (i.e., a member service representative device) corresponding to credit card account transfers.

The method 200 also includes determining (block 206) communication outcome data. For example, the communication outcome data may indicate whether the product or service goal (e.g., increased credit card sales, credit card account transfer, etc.) is met or achieved at a conclusion of the customer communication. In some embodiments, the customer communication with the member service representative group may be assessed an outcome score over a range of outcome scores, including at least a first score indicating that the product or service goal was completely satisfied (e.g., sales exceeding a threshold amount), a second score indicating that the product or service goal was partially satisfied (e.g., sales that do not exceed the threshold amount, or that exceed a minimum threshold amount but do not exceed a target threshold amount), and a third score indicating that the product or service goal was completely unsatisfied (e.g., no sales).

The method 200 also includes updating (block 208) a first communication routing model of a number of communication routing models based on the communication outcome data. For example, as previously described, the communication routing recommendation may be based on a determination that a particular communication routing model produced a higher score (e.g., raw score or weighted score) than other communication routing models. At block 208, the communication routing model that produced the higher score (e.g., raw score or weighted score) and ultimately dictated the communication routing recommendation may be modified based on the communication outcome data. In one example, if the product or service goal associated with said communication routing model is not achieved (e.g., the communication outcome score indicates that the product or service goal was completely unsatisfied), then the communication routing model may be updated to produce a lower score in future iterations employing the same or similar customer communication data (e.g., the same or similar product or service types, the same or similar recent customer activity, etc.). In another example, if the product or service goal associated with the communication routing model that dictated the communication routing recommendation is completely satisfied (e.g., the communication outcome score indicates that the product or service goal was completely satisfied), then the communication routing model may be updated to produce a higher score in future iterations employing the same or similar customer communication data (e.g., the same or similar product or service types, the same or similar recent customer activity, etc.).

The method 200 also includes updating (block 210) a second communication routing model of the number of communication routing models based on the communication outcome data. For example, the customer communication may have been routed to a member service representative group based on the first communication routing model producing a higher score than the second communication routing model. As noted above, the first communication routing model may be modified based on the communication outcome data. At block 210, the second communication routing model, which produced a lower score and did not dictate the communication routing recommendation, may also be modified based on the communication outcome data. In one example, the communication outcome data may indicate that the product or service goal of the first communication routing model was not achieved, but the product or service goal of the second communication routing model was achieved. Accordingly, the second communication routing model may be updated to produce a higher score in future iterations employing the same or similar customer communication data (e.g., the same or similar product or service types, the same or similar recent customer activity, etc.).

The method 200 also includes modifying (block 212) business priority weights associated with the number of communication routing models. As previously described, the business may modify the business priority weights based on transient business needs (e.g., handling a natural disaster). Additionally or alternatively, the business priority weights may be modified or updated based on the communication outcome data. For example, the communication outcome data may indicate that the current communication routing scheme is not adequately routing customer communications to appropriate member service representative groups designated to handling, for example, issues relating to natural disasters, such as insurance claims. Accordingly, the business priority weights may be modified to increase a likelihood that communication routing models associated with insurance will produce higher scores than communication routing models associated with another product or service type, such as credit cards, retirement accounts, retail goods, etc.

Technical effects associated with presently disclosed embodiments include improved achievement or satisfaction of product or service goals (e.g., increased sales, improved communication resolution, etc.) and improved efficiency in call routing systems and methods.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. One or more tangible, non-transitory, computer readable media storing instructions thereon that, when executed by at least one processor, are configured to cause the at least one processor to:
   determine, via a communication routing model, a score corresponding to a likelihood that a customer communication will satisfy a product or service goal associated with a product or service type;
   route, based on the score, the customer communication to a member service representative group corresponding to the product or service goal, the product or service type, or both; and
   update the communication routing model based on data indicative of an outcome of the customer communication with the member service representative group.

2. The one or more tangible, non-transitory, computer readable media of claim 1, wherein the instructions, when executed by the at least one processor, are configured to cause the at least one processor to:
   determine, via an additional communication routing model, an additional score corresponding to an additional likelihood that the customer communication will satisfy an additional product or service goal associated with an additional product or service type; and
   route, based on a consideration of the score and the additional score, the customer communication to the member service representative group corresponding to the product or service goal, the product or service type, or both.

3. The one or more tangible, non-transitory, computer readable media of claim 2, wherein the instructions, when executed by the at least one processor, are configured to cause the at least one processor to determine, based on the consideration of the score and the additional score, that the score is greater than the additional score.

4. The one or more tangible, non-transitory, computer readable media of claim 1, wherein the instructions, when executed by the at least one processor, are configured to cause the at least one processor to determine the score as a function of a raw score and a weight applied to the raw score, the weight corresponding to a business priority associated with the product or service goal, the product or service type, or both.

5. The one or more tangible, non-transitory, computer readable media of claim 1, wherein the product or service goal includes a sales goal.

6. The one or more tangible, non-transitory, computer readable media of claim 1, wherein the product or service goal includes a communication resolution goal.

7. The one or more tangible, non-transitory, computer readable media of claim 1, wherein the product or service type includes credit cards, debit cards, insurance, or any combination thereof.

8. The one or more tangible, non-transitory, computer readable media of claim 1, wherein the data indicative of the outcome of the customer communication with the member service representative group includes information indicating whether the product or service goal was met.

9. A computer-implemented method, comprising:
   determining, via a communication routing model executed by processing circuitry, a score corresponding to a likelihood that a customer communication will satisfy a product or service goal associated with a product or service type;
   routing, based on the score and via the processing circuitry, the customer communication to a member service representative group corresponding to the product or service goal, the product or service type, or both; and
   updating, via the processing circuitry, the communication routing model based on data indicative of an outcome of the customer communication with the member service representative group.

10. The computer-implemented method of claim 9, comprising:
    determining, via an additional communication routing model executed by the processing circuitry, an additional score corresponding to an additional likelihood that the customer communication will satisfy an additional product or service goal associated with an additional product or service type; and
    route, based on a consideration of the score and the additional score by the processing circuitry, the customer communication to the member service representative group corresponding to the product or service goal, the product or service type, or both.

11. The computer-implemented method of claim 10, comprising determining, based on the consideration of the score and the additional score by the processing circuitry, that the score is greater than the additional score.

12. The computer-implemented method of claim 9, comprising determining, via the processing circuitry, the score as a function of a raw score and a weight applied to the raw score, the weight corresponding to a business priority associated with the product or service goal, the product or service type, or both.

13. The computer-implemented method of claim 9, wherein the product or service goal includes a sales goal.

14. The computer-implemented method of claim 9, wherein the product or service goal includes a communication resolution goal.

15. The computer-implemented method of claim 9, wherein the product or service type includes credit cards, debit cards, insurance, or any combination thereof.

16. The computer-implemented method of claim 9, wherein the data indicative of the outcome of the customer communication with the member service representative group includes information indicating whether the product or service goal was met.

17. One or more tangible, non-transitory, computer readable media storing instructions thereon that, when executed by a processor system including one or more processors, are configured to cause the processor system to:
    determine, via a first communication routing model, a first score corresponding to a first likelihood that a customer communication will satisfy a first product or service goal associated with a first product or service type;

determine, via an additional communication routing model, a second score corresponding to a second likelihood that the customer communication will satisfy a second product or service goal associated with the first product or service type or a second product or service type; and route, based on the first score exceeding the second score, the customer communication to a member service representative group corresponding to the first product or service goal and the first product or service type.

18. The one or more tangible, non-transitory, computer readable media of claim 17, wherein the instructions, when executed by the processor system, are configured to cause the processor system to update the first communication routing model based on data indicative of an outcome of the customer communication with the member service representative group.

19. The one or more tangible, non-transitory, computer readable media of claim 17, wherein the instructions, when executed by the processor system, are configured to cause the processor system to:

determine the first score as a first function of a first raw score and a first weight; and determine the second score as a second function of a second raw score and a second weight, wherein the first weight and the second weight correspond to one or more business priorities associated with the first product or service goal, the second product or service goal, the first product or service type, the second product or service type, or any combination thereof.

20. The one or more tangible, non-transitory, computer readable media of claim 17, wherein:

the first product or service goal includes a sales goal or a communication resolution goal; and the first product or service type includes credit cards, debit cards, or insurance.

\* \* \* \* \*